United States Patent [19]
Zuiderveld

[11] Patent Number: 5,566,282
[45] Date of Patent: Oct. 15, 1996

[54] APPARATUS AND METHOD FOR THE VISUALIZATION OF A THREE-DIMENSIONAL SCENE BY MEANS OF MAXIMUM INTENSITY PROJECTION

[75] Inventor: Karel J. Zuiderveld, Houten, Netherlands

[73] Assignee: U.S. Philips Corporation, New York, N.Y.

[21] Appl. No.: 196,921

[22] Filed: Feb. 15, 1994

[30] Foreign Application Priority Data

Feb. 15, 1993 [EP] European Pat. Off. ............ 93200408

[51] Int. Cl.$^6$ .................................................. G06T 17/00
[52] U.S. Cl. ............................................................ 395/124
[58] Field of Search .................................. 395/124, 132; 364/413.13, 413.18, 413.22; 378/51

[56] References Cited

U.S. PATENT DOCUMENTS

| | | | |
|---|---|---|---|
| 5,125,015 | 6/1992 | Shimoni | 378/51 |
| 5,313,567 | 5/1994 | Civanlar et al. | 395/124 |
| 5,331,552 | 7/1994 | Lloyd et al. | 364/413.22 |
| 5,361,385 | 11/1994 | Bakalash | 395/124 |

*Primary Examiner*—Mark K. Zimmerman
*Attorney, Agent, or Firm*—Jack D. Slobod

[57] ABSTRACT

An arrangement and a method for maximum intensity projection of a three-dimensional scene on a two dimensional display (11), via the calculation of first or higher-order interpolated values of points ($P_1, \ldots, P_m$) along rays (61) casted through a voxel representation (50) of said scene avoids unnecessary interpolation operations by, firstly, determining an estimated minimum value for each ray (61) under consideration and for each sample point ($P_k$) an estimated maximum value for the interpolated value. Only if the estimated maximum value for a point exceeds the estimated minimum value for the ray (61), an interpolation is required. Both estimated extremes are obtained by comparing the values contributing to the interpolations, the estimated minimum value by an analog procedure or by reference to a neighboring ray.

18 Claims, 1 Drawing Sheet

APPARATUS AND METHOD FOR THE VISUALIZATION OF A THREE-DIMENSIONAL SCENE BY MEANS OF MAXIMUM INTENSITY PROJECTION

BACKGROUND OF THE INVENTION

1. Field of the Invention

The invention relates to an arrangement for the visualization of a three-dimensional scene by means of maximum intensity projection (MIP), the arrangement comprising a display having a two-dimensional matrix of pixels; a memory for storing data representing the three-dimensional scene as a plurality of voxel values; and computing means, having access to said memory, for assigning to pixels of the display a greyvalue being a maximum of interpolated greyvalues along rays through the scene, associated with said pixels. Such an arrangement or workstation is, for example, used for inspection of images of a volume of which the distribution of a parameter is obtained in three dimensions by means of a technique such as magnetic resonance imaging or three-dimensional computed tomography. In particular, MIP is a technique often used in clinical applications of magnetic resonance angiography (MRA).

2. Description of the Related Art

With MRA, volume data is usually too noisy for providing satisfactory projection images using techniques based on extraction and shadowing of surfaces. With MIP, for each pixel of the output image a ray is casted through the image volume. The maximum greyvalue encountered along said ray, i.e. at any one of the sample positions at which the greyvalue is calculated, is used as the resulting greyvalue of the pixel.

As the casted rays or the sample points do, in general, not coincide with voxel centers, the greyvalues associated with the sample points have to be calculated from nearby voxel values. Good image quality can be obtained by trilinear (first order) interpolation of voxel values. Even better image quality can be obtained by using more complex methods of (higher order) interpolation.

First or higher order interpolations are computationally expensive operations. When floating point operations are used, calculation of an MIP image having $256^2$ pixels, typically requires in the order of 0.5 GFLOPS ($5 \times 10^8$ floating point operations) if a trilinear interpolation is used. On a currently commercially available workstation this represents a total processing time of about one minute. With clinical application of MIP, it is desirable to calculate multiple high-quality projection images. An often used way of presentation is in the form of a sequence of projection images with angles which differ only slightly (3°–6°) from each other. Since the resulting images have to be available within a short period, the high computational requirements associated with trilinear or higher order interpolation are prohibitive. In clinical practice, nearest neighbor (zero-th order) interpolation techniques that lead to inferior image quality are therefore used. Also in other possible applications a fast calculation of a high-quality image is desirable, for example, when the choice of a later two-dimensional projection is determined by what is visible in an earlier image.

SUMMARY OF THE INVENTION

It is, inter alia, an object of the invention to provide a workstation and a method in which the calculation of a maximum intensity projection (MIP) using first or higher order interpolation is performed significantly faster compared with conventional implementations of this technique.

According to the invention, an arrangement for the visualization of a three-dimensional scene by means of MIP is provided wherein said computing means are arranged
 a) for determining, for each ray, an estimated minimum greyvalue;
 b) for determining for each point of a plurality of points along said ray an estimated maximum greyvalue, said estimated maximum greyvalue being derived from the voxel values of voxels within a predetermined neighborhood around said point;
 c) for comparing each estimated maximum greyvalues of said points with said estimated minimum greyvalue for said ray;
 d) for calculating an interpolated greyvalue for a point in case for said point along the ray the estimated maximum greyvalue exceeds said estimated minimum greyvalue; and
 e) for determining the maximum of the interpolated greyvalues for assignment to the pixel to which said ray is associated. The invention is based upon the realization that a large fraction of the required higher order interpolations can be replaced by less accurate, but much faster, operations when information on the range of possible greyvalues is available during the processing of a ray. This range is specified by its extremes, the minimum and the maximum values, in a number of subvolumes as well as for a ray under consideration. If the estimated minimum greyvalue for a ray exceeds the estimated maximum greyvalue for a sample point along that ray, the computationally expensive interpolation step can be omitted as the value resulting from the interpolation cannot be the greyvalue that will be assigned to the associated pixel.

It is remarked that the terms "maximum" and "minimum" in the present description and claims denote the two opposite directions of a parameter that can be expressed on a linear scale. In this context, the "maximum" of the parameter within a dataset needs not to be numerically larger that the "minimum" of that parameter in the same dataset. The chosen terms are used in this description and the appending claims to conform to conventional clinical use in MRA. "Minimum intensity projection" is to be considered similar to "maximum intensity projection". The term "greyvalue" is used to denote a point on said linear scale.

Further speed improvement is obtained in an arrangement according to the invention wherein the computing means is arranged for handling sequentially in time the points along said ray, said handling comprising for each point
 —determining the estimated maximum greyvalue;
 —comparing said estimated maximum greyvalue with the largest interpolated greyvalue determined for any of the points along said ray already handled; and
 —skipping the calculation of an interpolated greyvalue if said estimated maximum greyvalue does not exceed said largest interpolated greyvalue.
The estimated maximum of a sample point is compared with the largest of the calculated interpolated values and the estimated minimum greyvalue in the ray under consideration. Only if the estimated maximum greyvalue of a sample point exceeds the estimated minimum greyvalue of the ray, an interpolation is performed.

In an embodiment according to the invention this is realized in that the computing means is arranged for determining the estimated maximum greyvalue of a point as the maximum of all voxel values within a predetermined neighborhood of the point. As the result of a linear interpolation will lie between the maximum and minimum greyvalues of the sample points used in the calculations, the maximum greyvalue from these points provides a rapidly accessible estimate. In case of a higher order interpolation a fast estimate can be obtained from the maximum value in combination with the range of voxel values.

Similarly, the estimation of the minimum greyvalue for a ray is performed in an arrangement according to the invention in which the computing means is arranged for determining an estimated minimum greyvalue for a ray by —determining for each sample point on said ray a minimum value being the minimum of voxel values within a predetermined neighborhood of that sample point and —establishing the maximum of said minimum values as the estimated minimum greyvalue.

Alternatively, the initial estimation of the minimum greyvalue can be performed if the computing means is arranged for determining an estimated minimum greyvalue for a ray by calculating the interpolated greyvalue of a sample point on said ray, said sample point having a relatively small geometrical distance to a position where an adjacent ray is determined to have a relatively large greyvalue, for example, its maximum greyvalue. The greyvalue of the ray is estimated by calculating a greyvalue by means of interpolation in a region in which it is probable that a high greyvalue will result.

Preferably, an embodiment of the arrangement according to the invention comprises an additional memory and computing means for storing in said additional memory for each voxel a local minimum value and/or a local maximum value, said local minimum or local maximum values being the minimum or maximum values of all voxel values within a predetermined neighborhood from said voxel. In this arrangement, image formation speed is improved as the determination of an estimated minimum and/or maximum value of each voxel is performed only once. If the same voxel is traversed by another ray or during the calculation of subsequent images, one or both of the estimated extremes for that voxel need not to be determined anew.

In a preferred embodiment, the memory is organized for storing values for voxels which are arranged in a three-dimensional rectangular matrix and in which said predetermined neighborhood for a point comprises the voxel in which the point is located and all adjacent voxels. The greyvalue of a sample point is determined from the greyvalues of the voxels in a predetermined neighborhood. In case of trilinear interpolation, said predetermined neighborhood is, for example, a 3×3×3 subvolume around the sample point. For a particular interpolation only the eight voxel values, out of the 27 voxel values in the neighborhood, nearest to the sample point may be used in the calculation. In general, trilinear interpolation gives a satisfactory compromise between speed of calculation and accuracy of result. If desired, an even better image quality can be obtained by using more complex methods as cubic spline interpolation using more voxel values.

The invention also relates to a method for calculating, from a dataset of voxel values representing a scene in three-dimensions, a maximum intensity projection along a plurality of rays, wherein to each ray a greyvalue is assigned being a maximum of interpolated greyvalues along said ray, in which method for each ray a) an estimated minimum greyvalue is determined;

b) for each of a plurality of points along said ray an estimated maximum greyvalue is determined, said estimated maximum greyvalue being derived from the voxel values of voxels within a predetermined neighborhood around said point;

c) each estimated maximum greyvalue of said points is compared with said estimated minimum greyvalue;

d) if it is established that, for a point along the ray an estimated maximum greyvalue exceeds said estimated minimum greyvalue, an interpolated greyvalue for said point is calculated; and e) the maximum of the interpolated greyvalues is determined.

As discussed hereinbefore in relation to the invented apparatus, the speed for performing the method is increased by performing a preprocessing step comprising the calculation and storage of a local minimum value and/or a local maximum value for each voxel, said local minimum or local maximum values being the minimum or maximum values of all voxel values within a predetermined neighborhood from said voxel.

BRIEF DESCRIPTION OF THE DRAWING

These, and other more detailed aspects of the invention will now be elucidated by way of example with reference to the accompanying drawing, wherein:

FIG. 4 is a flow chart outlining the steps performed by the workstation in assigning values to the pixels of the maximum intensity projection (MIP) image.

DETAILED DESCRIPTION OF THE PREFERRED EMBODIMENTS

Figure 1:
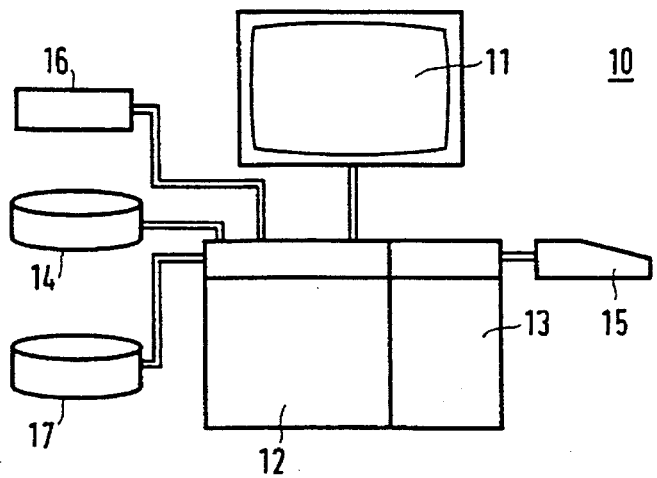
FIG. 1 shows diagrammatically a workstation according to the invention.

FIG. 1 shows a few elements of a workstation 10 for the present invention. The workstation 10 comprises a display screen 11 for displaying images, a memory 12 and computing means 13, for example, a processor specially designed for the type of calculations needed for the inventions or a single or multiple high performance processors of a more general type. The workstation further comprises an input device 14 for input of data that are to be processed and displayed. Such an input device is, for example a magnetic or optical disc reader or a magnetic tape reader. It may also be a link to a central data storage or to a device that generates volume data. An operator console 15, for example a keyboard, is provided for the user to give commands to the workstation. Additional devices may be connected to the workstation, such as a printing unit 16 to provide a hard copy of the image visible on the display or a storage unit 17 for storing processed images for later recall.

If the workstation is used for inspection of a volume by showing images, each of which is generated by means of MIP, data have to be accessed and treated as follows. The data are read from the input device 14 and are stored in the memory 12. The data represent a parameter to be shown as a number of values, each value giving the parameter value as determined in a small volume element (voxel) of the volume investigated by means of a method such a magnetic resonance imaging or computed tomography. A projection of the volume data is performed and displayed on the screen, in the case to which the present invention relates, the projection is a MIP. The choice of the projection is entered to the workstation by means of the operator console 15.

The choice of the projection may represent such things as zooming, leaving out a portion of the volume, for example the front or back half, or the choice of angles or perspective. In clinical use, often a sequence of projections is chosen in which angles vary slightly as to create a "rotating" or "moving" image. For examining details in the data more closely, different projections are chosen in dependence of results of earlier projections. Part of the memory 12 may be used to store intermediate values obtained from the basic data read in from the input device.

Figure 2:
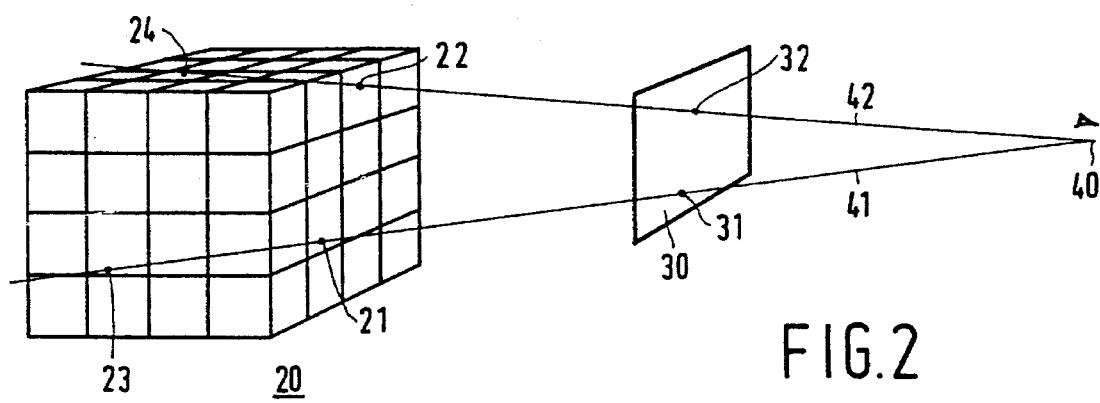
FIG. 2 shows diagrammatically a rectangular matrix of voxels and their relationship to a screen.

In FIG. 2 the relation between the set of voxels as stored in the memory and the pixels on the display is shown in conjunction with two representative rays. The volume is shown as a matrix 20 of voxel values which is looked at from a viewpoint 40 through a window 30. The viewpoint 40 is to be considered the location of an eye and the window 30 is represented by the display screen of the workstation. From the viewpoint 40, rays 41 and 42 are cast via the window 30 through the volume or matrix 20. The trajectory of the rays 41 and 42 is determined by the locations of pixels 31 and 32 in the window. The rays traverse the volume from entry points 21 and 22 to exit points 23 and 24, respectively. With MIP, the largest greyvalue associated with sample points along the rays 41, 42 in between the entry points 21, 22 and exit points 23, 24 is determined and that value is assigned to the pixel 31, 32 associated with the rays 41, 42, respectively. Preferably, the sample points should have a mutual distance at most equal to a voxel length in order to ascertain that the maximum is not skipped.

Figure 3:
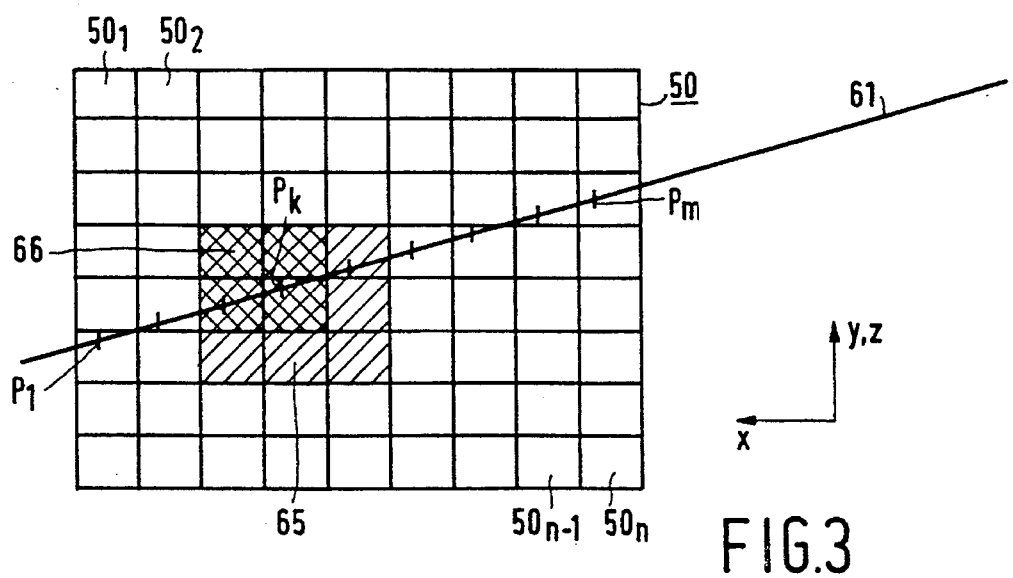
FIG. 3 shows in a two-dimensional representation the determination of estimated values for a few sample points and for a ray.

The determination of the maximum intensity projection according to the invention is illustrated in FIGS. 3 and 4. For clarity the Figure is shown in two dimensions only. A ray 61 traverses a volume 50 composed of n voxels $50_1, 50_2, \ldots, 50_{n-1}, 50_n$. The ray can be parameterised by the equations $y = a_{61}x + b_{61}$ and $z = c_{61}x + d_{61}$ in which x represents the longitudinal direction and y and z the transverse directions, $a_{61}, b_{61}, c_{61}$ and $d_{61}$ are determined by the positions of the viewpoint and the pixel whose greyvalue is to be determined. Within the volume 50, a number of sample points $P_1, \ldots, P_m$ on the ray 61 is selected, for example one per slice of voxels in the longitudinal direction. Fewer sample points increase the risk that an existing maximum value is not sampled. In the case of more sample points, an increase of the accuracy is achieved but at the expense of a considerably increased computational effort. For each sample point, the interpolated greyvalue is compared with the maximum value previously encountered along the ray in order to determine the maximum value searched for.

In a first step 71, for each ray 61, each of the voxels in which a sample point $P_i$ is contained is considered and the minimum value from that voxel and its neighboring voxels is determined. The neighborhood has to be chosen as those voxels of which the values may contribute to the interpolation at the sample point $P_i$. A 3×3(×3) neighborhood around sample point $P_k$ is indicated in FIG. 3 by the hatched area 65. As, in a linear interpolation, the interpolated value at a point $P_i$ will be at least the minimum value of the voxels that are contained in its neighborhood, the greyvalue for the ray 61 is at least the maximum of the set of minimum values determined for each of the sample points $P_1, \ldots, P_m$. This maximum of the minimum values is called the estimated minimum value for the ray 61. In a second step 72, it is determined for each sample point $P_i$ whether or not it is necessary to calculate the interpolated value for that sample point. If the maximum voxel value within the neighborhood around a sample point $P_k$, referred to as the estimated maximum greyvalue for the sample point $P_k$, is less or equal than the estimated minimum value for the ray 61, the value at sample point $P_k$ cannot be the maximum along the ray 61 and a calculation of the interpolated value at the sample point $P_k$ can be skipped. Only if the maximum value within the neighborhood exceeds the estimated minimum value of the ray 61, it is possible that the interpolated value at sample point $P_k$ is the maximum value for ray 61 searched for and the interpolated value at that sample point should then be calculated in a third step 73. Thereafter, in a fourth step 74, the maximum of the interpolated greyvalues for the ray 61 is assigned as the value of the pixel of the MIP image which is associated with the ray.

The actual interpolation can be preformed by using eight voxel values only. The eight voxels of which the values are used form a 2×2×2 subset of the 3×3×3 neighborhood and are the voxel in which the sample point is located and the seven voxels which are directly adjacent to the octant of the first voxel containing the sample point. In FIG. 3 four of these voxels are indicated by the cross hatched section 66 of the hatched area 65.

A trilinear interpolation to be used in the invention is to determine the greyvalue G(x,y,z) of sample point P at a location (x,y,z): $G(x,y,z) = \alpha xyz + \beta xy + \gamma xz + \delta yz + \epsilon x + \xi y + \theta z + \theta$, calculated from eight voxel values. Said voxel values are those of 2×2×2 subset of voxels indicated hereinbefore and containing the sample point P. If for the purpose of illustration, the eight voxel centres are assumed to have positions 0 or 1 in the x, y and z directions, the voxel containing P being at the origin, and the corresponding greyvalues are denoted by $C_{000}, C_{001}, C_{010}, C_{011}, C_{100}, C_{101}, C_{110}$ and $C_{111}$, in which the index gives the xyz location, the greyvalue is calculated as:

$$\begin{aligned}G(x,y,z) = & (1-x)(1-y)(1-z)C_{000} + x(1-y)(1-z)C_{001} + \\ & (1-x)y(1-z)C_{010} + xy(1-z)C_{011} + \\ & (1-x)(1-y)zC_{100} + x(1-y)zC_{101} + \\ & (1-x)yzC_{110} + xyzC_{111}.\end{aligned}$$

The speed of the procedure described hereinbefore can be increased in several ways. A first improvement consists of a preprocessing step in which data for the voxel values of the volume are supplemented by one or two additional sets of derived voxel values. In a first set of derived voxel data, for each voxel the maximum within the selected neighborhood is stored and in a second set of derived voxel data for each voxel the minimum within the neighborhood is stored. This provides a speed improvement in that it is not necessary for voxels in which more sample points will be located, for different rays, to determine the minimum and maximum values in the neighborhood each time again. As the voxels used for a linear interpolation, 2×2×2 subset in the example above, is dependent on the position of the sample point within its voxel, which location is not known a priori, the neighborhood needs to comprise all voxels which possibly can contribute to the interpolation.

A second method for increasing the speed is replacing the current estimated minimum value for a ray with the interpolated greyvalue associated with the sample point in case that this greyvalue exceeds the current estimated minimum value of the ray. This requires that sample points along the ray are handled sequentially, however, not necessarily in the same order as they are present along the ray. This approach reduces the number of interpolations to be performed if the order of processing is chosen without using prior knowledge concerning the likely location of the maximum along the ray. A further increase of processing speed can be obtained by using the location of the maximum of an adjacent ray. By first handling sample points close to the location of the maximum of an adjacent ray, a better estimate of the minimum ray value can be obtained, thus leading to a further reduction in the number of interpolations to be performed.

Analog to the second improvement, the method according to the invention can be performed without determining the estimated minimum value for a ray from the maximum of the minimum values of the voxel neighborhoods along that ray. The initial estimate of the minimum greyvalue for the ray is determined by the first calculated interpolation, after which this estimated minimum greyvalue is replaced each time an interpolation is performed that yields a resulting value larger than the current estimated minimum greyvalue for that ray. If the initial calculated interpolation is made at a sample point close to the geometrical position where a large or the maximum greyvalue for an adjacent ray or pixel was found, it is likely that the initial interpolation gives a result close to the maximum value for the ray and, consequently, that a large number of interpolations can be skipped. Accordingly, very fast formation of MIP images can be achieved without an additional set of derived voxel values representing the minimum values within each voxels' neighborhood and tracing a ray through that additional set of derived voxel values.

A further possibility to obtain speed improvement is by means of a preprocessing step for each ray and using a very low sampling rate. The result of this preprocessing step is then used as the initial estimated minimum greyvalue in the actual MIP in which the same ray is sampled with the full sampling rate. This method is advantageous in case the features in the volume to be made visible with MIP comprise only a small fraction of the total volume and the background, i.e. the volume outside the interesting features, has a high level of noise. These conditions often occur in MRA data. A further advantage of this way of speed improvement does not need additional memory to store any additional sets of derived voxel values. The level of undersampling is preferably between 0.1 and 0.02 samples per voxel. Low sample rates (0.05 and lower) tend to give only minor improvement since only a few samples are evaluated along each ray. With higher sampling rates (0.25 and higher), the additional overhead of the preprocessing step, associated with ray casting and interpolations, becomes prohibitive. Some reduction of the overhead can be obtained by selecting the "undersampling" points from the points used during full sampling. Clearly, a combination of different methods for speed improvement is possible.

Even when one or more of the methods described hereinbefore is used, in MRA the major fraction of the trilinear, or higher order, interpolations is performed on samples that only contain background noise. Most of these background interpolations can be skipped by a technique called threshold-based interpolation. With this technique, a second constraint is added: Trilinear or higher order interpolation are only to be performed if the sample greyvalue corresponding to the maximum voxel value in a (3×3×3) subvolume around the sample point is larger than a user specified threshold. Otherwise it is assumed that the sample contains background noise and is not interesting.

When such an uninteresting sample is encountered, one can use a simpler interpolation technique, for example nearest neighbor, or completely ignore the sample. Although the latter requires less processing it may lead to disturbing artefacts when a ray does not cross any interesting voxels. A possible implementation incorporates both possibilities. In a preprocessing step using undersampling, nearest neighbor interpolation is used when samples fall below the threshold. When the actual MIP with full sampling rate is performed, samples with low value are ignored.

I claim:

1. Arrangement for visualization of a three-dimensional scene by means of maximum intensity projection, the arrangement comprising:

a display having a two-dimensional matrix of pixels;

a memory for storing data representing the three-dimensional scene as a plurality of voxel values; and computing means, having access to said memory, for assigning to said pixels of the two-dimensional matrix a greyvalue being a maximum of interpolated greyvalues along rays casted through the scene, which rays are associated in one-to-one correspondence with said pixels of the two-dimensional matrix, said computing means comprising:

a) means for determining, for each ray, an estimated minimum greyvalue;

b) means for determining for each point ($P_k$) of a plurality of points ($P_1, \ldots P_m$) along said ray an estimated maximum greyvalue, said estimated maximum greyvalue being derived from the voxel values of voxels within a predetermined neighborhood around said point ($P_k$);

c) means for comparing the estimated maximum greyvalues of said points along said ray with said estimated minimum greyvalue for said ray;

d) means for calculating an interpolated greyvalue for a point ($P_k$) along said ray when the estimated maximum greyvalue for said point ($P_k$) exceeds said estimated minimum greyvalue for said ray; and e) means for determining the maximum of the interpolated greyvalues for assignment to the pixel of the two-dimensional matrix to which said ray is associated.

2. Arrangement according to claim 1, wherein the computing also comprises configured for handling sequentially in time the points ($P_1, \ldots, P_m$) along said ray, said handling means comprising:

means for determining the estimated maximum greyvalue;

means for comparing said estimated maximum greyvalue with a largest interpolated greyvalue determined for any of the points along said ray already handled; and means for skipping the calculation of an interpolated greyvalue if said estimated maximum greyvalue does not exceed said largest interpolated greyvalue.

3. Arrangement according to claim 2, wherein the computing means is also comprises configured for determining the estimated maximum greyvalue of a point ($P_k$) as the maximum of all voxel values within a predetermined neighborhood of the point.

4. Arrangement according to claim 3, wherein the computing means is also comprises configured for determining an estimated minimum greyvalue for a ray by calculating the interpolated greyvalue of a sample point on said ray, said sample point having a relatively small geometrical distance to a position where an adjacent ray is determined to have a large or its maximum greyvalue.

5. Arrangement according to claim 2, wherein the computing means is also comprises configured for determining an estimated minimum greyvalue for a ray comprising:

means for determining for each sample point ($P_k$, k=1, .., m) on said ray a minimum value being the minimum of voxel values within a predetermined neighborhood of that sample point ($P_k$) and means for establishing a maximum of said minimum values as the estimated minimum greyvalue.

6. Arrangement according to claim 2, wherein the computing means is also comprises configured for determining an estimated minimum greyvalue for a ray by calculating the interpolated greyvalue of a sample point on said ray, said sample point having a relatively small geometrical distance to a position where an adjacent ray is determined to have a large or its maximum greyvalue.

7. Arrangement according to claim 2 comprising an additional memory and computing means for storing in said additional memory for each voxel a local minimum value and/or a local maximum value, said local minimum or local maximum values being the minimum or maximum values of all voxel values within said predetermined neighborhood from said voxel.

8. Arrangement according to claim 1, wherein the computing means also comprises configured for determining the estimated maximum greyvalue of a point ($P_k$) as the maximum of all voxel values within a predetermined neighborhood of the point.

9. Arrangement according to claim 3, wherein the computing means is also comprises configured for determining an estimated minimum greyvalue for a ray comprising:

means for determining for each sample point ($P_k$, k=1, ..., m) on said ray a minimum value being the minimum of voxel values within a predetermined neighborhood of that sample point ($P_k$) and means for establishing a maximum of said minimum values as the estimated minimum greyvalue.

10. Arrangement according to claim 3, wherein the computing means is also comprises configured for determining an estimated minimum greyvalue for a ray by calculating the interpolated greyvalue of a sample point on said ray, said sample point having a relatively small geometrical distance to a position where an adjacent ray is determined to have a large or its maximum greyvalue.

11. Arrangement according to claim 3 comprising an additional memory and computing means for storing in said additional memory for each voxel a local minimum value and/or a local maximum value, said local minimum or local maximum values being the minimum or maximum values of all voxel values within said predetermined neighborhood from said voxel.

12. Arrangement according to claim 1, wherein the computing means also comprises configured for determining an estimated minimum greyvalue for a ray comprises:

means for determining for each sample point ($P_k$, k=1, ..., m) on said ray a minimum value being the minimum of voxel values within a predetermined neighborhood of that sample point ($P_k$) and means for establishing a maximum of said minimum values as the estimated minimum greyvalue.

13. Arrangement according to claim 1, wherein the computing means is also comprises configured for determining an estimated minimum greyvalue for a ray by calculating the interpolated greyvalue of a sample point on said ray, said sample point having a relatively small geometrical distance to a position where an adjacent ray is determined to have a large or its maximum greyvalue.

14. Arrangement according to claim 1 comprising an additional memory and computing means for storing in said additional memory for each voxel a local minimum value and/or a local maximum value, said local minimum or local maximum values being the minimum or maximum values of all voxel values within said predetermined neighborhood from said voxel.

15. Arrangement according to claim 6, in which the voxels are arranged in a three-dimensional rectangular matrix and in which said predetermined neighborhood for a point comprises the voxel in which the point is located and all adjacent voxels.

16. Arrangement according to claim 1, in which the computing means is arranged for calculating an interpolated greyvalue by means of a three-dimensional linear interpolation.

17. Method for calculating, from a dataset of voxel values representing a scene in three-dimensions, a maximum intensity projection along a plurality of rays casted through the scene wherein to each ray a greyvalue is assigned, being a maximum of interpolated greyvalues along said ray, in which method for each ray:

a) an estimated minimum greyvalue for said ray is determined;

b) for each of a plurality of points along said ray an estimated maximum greyvalue is determined, said estimated maximum greyvalue being derived from voxel values of voxels within a predetermined neighborhood around said point;

c) each estimated maximum greyvalue of said points is compared with said estimated minimum greyvalue;

d) if it is established that, for a point along said ray an estimated maximum greyvalue exceeds said estimated minimum greyvalue for said ray an interpolated greyvalue for said point is calculated; and e) the maximum of the interpolated greyvalues is determined.

18. Method according to claim 9 in which a preprocessing step is performed, the preprocessing step comprising the calculation and storage of a local minimum value and/or a local maximum value for each voxel, said local minimum or local maximum values being the minimum or maximum values of all voxel values within a predetermined neighborhood from said voxel.

\* \* \* \* \*